(12) United States Patent
Hart

(10) Patent No.: US 6,939,077 B1
(45) Date of Patent: Sep. 6, 2005

(54) PAVING BLOCK

(75) Inventor: Peter Leslie Hart, Near Bath (GB)

(73) Assignee: Formpave Holdings Limited, Gloucestershire (GB)

( * ) Notice: Subject to any disclaimer, the term of this patent is extended or adjusted under 35 U.S.C. 154(b) by 0 days.

(21) Appl. No.: 09/719,256

(22) PCT Filed: Jun. 10, 1999

(86) PCT No.: PCT/GB99/01844

§ 371 (c)(1),
(2), (4) Date: Dec. 7, 2000

(87) PCT Pub. No.: WO99/64680

PCT Pub. Date: Dec. 16, 1999

(30) Foreign Application Priority Data

Jun. 11, 1998 (GB) .................................. 9812462
Aug. 12, 1998 (GB) .................................. 9817498

(51) Int. Cl.[7] .............................................. E01C 5/06
(52) U.S. Cl. ............................ 404/39; 404/34; 404/36
(58) Field of Search ............... 404/29–46; 405/129.57, 405/129.7

(56) References Cited

U.S. PATENT DOCUMENTS

| | | | | |
|---|---|---|---|---|
| 126,171 A | * | 4/1872 | Ballard | 404/39 |
| 149,658 A | * | 4/1874 | Ingalls | 404/39 |
| 310,662 A | * | 1/1885 | Freeman | 404/39 |
| 572,762 A | * | 12/1896 | Landers | 404/31 |
| 1,417,010 A | | 5/1922 | Wright | |
| 3,722,162 A | * | 3/1973 | Ludvigsen | 52/608 |
| 4,792,257 A | * | 12/1988 | Rinninger | 404/39 |
| 5,051,023 A | * | 9/1991 | Yoshida et al. | 404/31 |
| 5,078,543 A | * | 1/1992 | Terrel | 405/128 |
| 5,342,141 A | * | 8/1994 | Close | 404/28 |
| 5,645,369 A | * | 7/1997 | Geiger | 404/34 |
| 5,788,413 A | * | 8/1998 | Peggs | 405/129 |
| 5,797,698 A | * | 8/1998 | Barth et al. | 404/39 |
| 5,980,155 A | * | 11/1999 | Jones et al. | 405/43 |
| 6,079,902 A | * | 6/2000 | Pettee, Jr. | 405/35 |

FOREIGN PATENT DOCUMENTS

| | | | | |
|---|---|---|---|---|
| DE | 271 578 C | | 3/1914 | |
| EP | 0 504 536 A | | 9/1992 | |
| GB | 2227775 A | * | 1/1989 | ........... E01C 11/22 |
| JP | WO88/06207 | * | 8/1988 | ............. E01C 5/06 |
| NL | 6 711 788 A | | 3/1969 | |
| WO | 93 07339 A | | 4/1993 | |
| WO | 96 12067 A | | 4/1996 | |

* cited by examiner

Primary Examiner—Thomas B. Will
Assistant Examiner—Raymond W. Addie
(74) Attorney, Agent, or Firm—Gifford, Krass, Groh, Sprinkle, Anderson & Citkowski, P.C.

(57) ABSTRACT

There is disclosed a paving block for use in the construction of a paved surface, which paving block has a top surface, a bottom surface and at least one lateral surface extending between the top and bottom surfaces and abutting in use at least part of a lateral surface of at least one adjacent paving block, wherein a portion of the lateral surface of the paving block adjacent to the top surface is tapered.

10 Claims, 7 Drawing Sheets

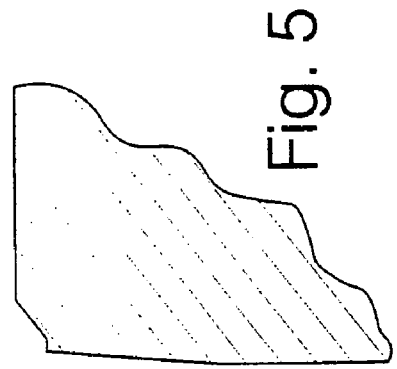
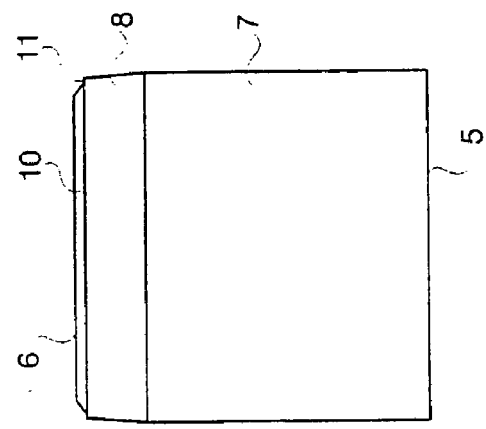
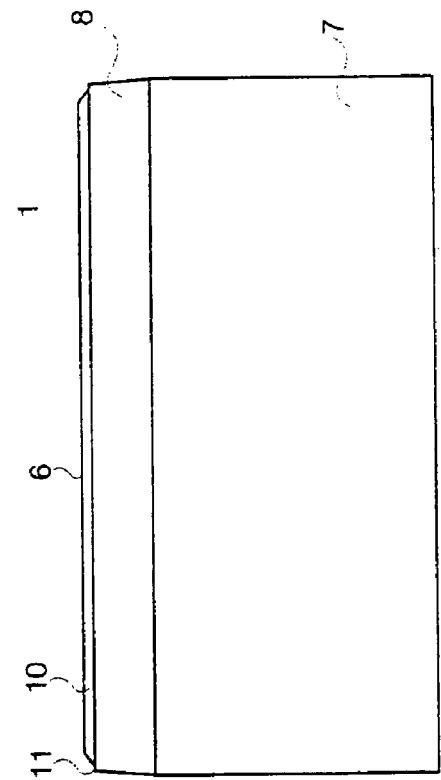
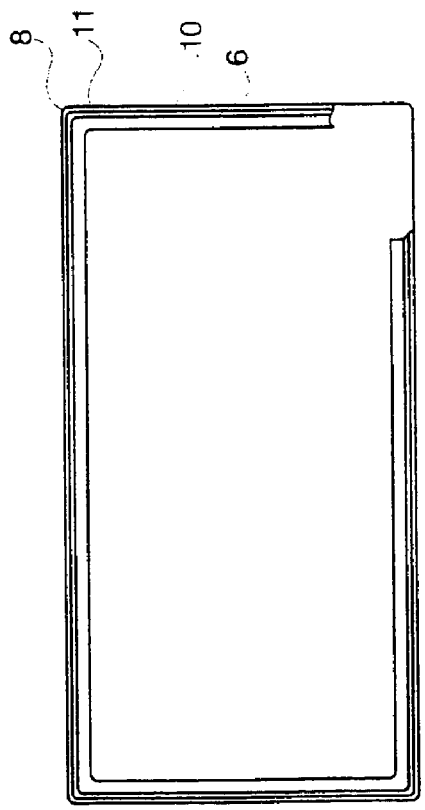

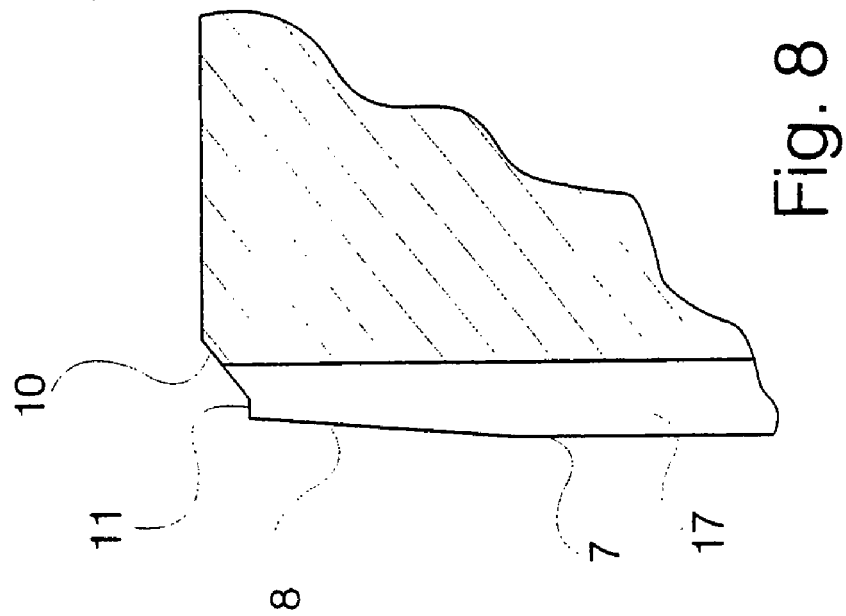
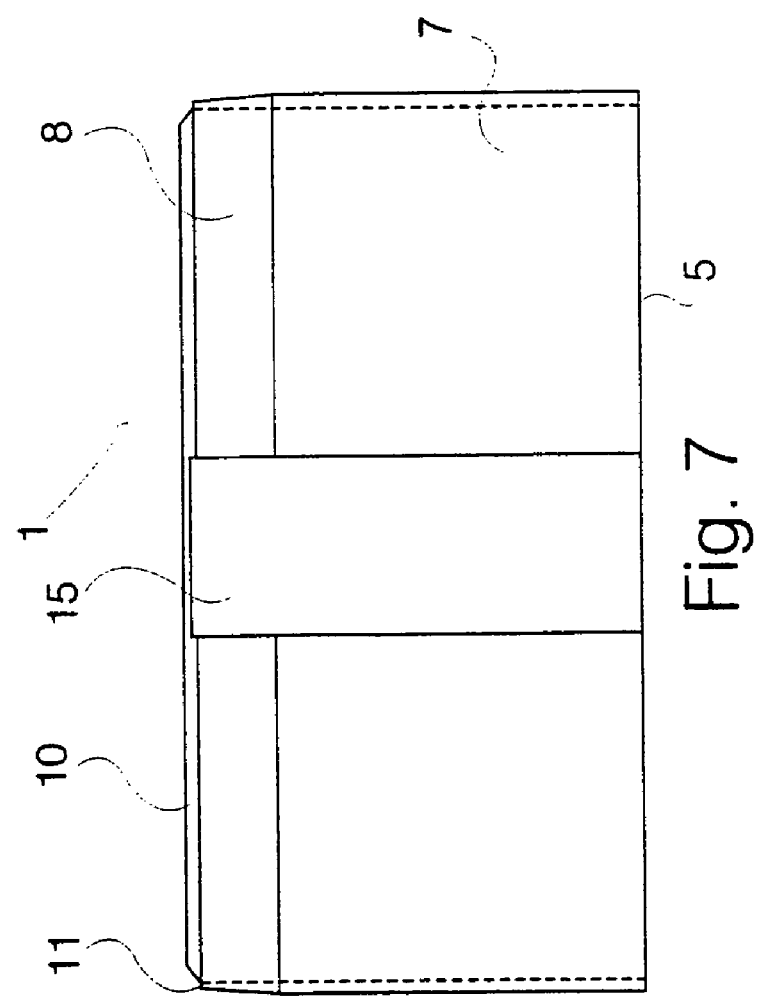

PAVING BLOCK

This application relates to paving blocks for use in the construction of paved surfaces.

Paved surfaces constructed from individual, discrete paving blocks have an increasingly wide range of applications. The decorative or functional nature of such paving blocks may be detrimentally affected by spalling, that is fragmentation, particularly of their upper faces. This is particularly a problem in paving systems which are constructed by close-fitting of individual paving blocks without any joint filling such as mortar or sand, as the paving blocks in these systems are in contact with one another which can cause fracturing pressures to be exerted upon relative movement of individual paving blocks which take place from time to time due to applied loads from traffic and thermal dilatation from for example diurnal temperature variations.

There is an obvious need to reduce the tendency of paved surfaces to deteriorate by spalling, but solutions to this problem are not easily found. The present invention seeks to provide a paving block which will not suffer to the same extent as prior art paving blocks, if at all, from the problem of contact induced spalling.

According to a first aspect of the present invention there is provided a paving block for use in the construction of a paved surface, which paving block has a top surface, a bottom surface and at least one lateral surface extending between the top and bottom surfaces and abutting in use at least part of a lateral surface of at least one adjacent paving block, wherein a portion of the lateral surface of the block adjacent the top surface is tapered.

By forming a block such that an upper part is tapered, that is with an upper part of a lateral surface inwardly inclining, the paving block can be laid together with a plurality of such blocks to form a paved surface in which if adjacent blocks move against one another there are no direct contact forces at the junction between the top surface and the lateral surfaces since the lateral surfaces of adjacent blocks are in fact held spaced from one another.

Although it is preferred that each lateral surface of a paving block is provided with a tapered portion it is possible to envisage embodiments of the invention in which only some of the lateral surfaces are provided with tapered portions. For example, if only two contiguous lateral surfaces of a rectangular paving block are provided with tapered portions it is still possible to lay them with other such paving blocks in such a way that any two facing lateral surfaces of two adjacent blocks have one tapered portion between them. This may be achieved, for example, with a so-called "herringbone" laying pattern, which is preferred, although others may also be used (for example English bond pattern) and achieve the same objective.

It is also preferred that the tapered portion extend along the entire edge between the or each lateral surface and the top surface. In such cases the paving block is in effect provided with a tapered surface extending between the or each lateral surface and its top surface.

The portion of the lateral surface which is tapered may extend over any desired part of the height i.e. length, of the lateral surface. It is, however, preferred that the portion of the lateral surface which is tapered be greater than 10% and less than 80% of the entire length or height of the lateral surface. More preferably the portion of the lateral surface which is tapered is in the range of 20 to 30%, e.g. 25%, of the lateral surface.

The angle at which the lateral surface is tapered with respect to the remaining non-tapered portion of the lateral surface may be any suitable angle greater than 0° and less than 90°, but is preferably in the range of greater than 0° to less than 35°, more preferably greater than 0° to less than 15° and most preferably between 5° and 10°.

The dimensions of the portion of the lateral surface which is tapered and the angle of inclination may be the same or different for each lateral surface of the paving block. In one embodiment, which is currently preferred, at least corresponding lateral surfaces, i.e. those on opposing sides, or all lateral sides have a tapered portion of the same dimensions and angle of inclination so that the paving block has a degree of symmetry.

According to a second aspect of the present invention there is provided a paving block for use in the construction of a paved surface, which paving block has a top surface, a bottom surface and lateral surfaces extending between the top and bottom surfaces, in which at least one of the lateral surfaces has a channel extending substantially from the top to the bottom surface whereby to provide a drainage path for surface water or other liquid through the channel when the paving block is laid with other such paving blocks to form a paved surface.

The block may be provided with a channel in only one of its surfaces. Alternatively more than one lateral surface of the block may be provided with a channel. Each and all lateral surfaces of the paving block may have at least one such channel particularly for regularly shaped paving blocks, e.g. cuboid blocks. The channels provided on a block may have the same or different shapes or dimensions. The shape and dimensions of the channel should be such as to allow an adequate drainage rate for which they should provide a significant cross-sectional area for drainage. Suitable shapes include irregular cross-sectional shapes or regular ones including semi-circular or square-cut or rectangular-cut channels. The or each channel may be wider than it is deep and the depth preferably is not greater than around 1 cm. More particularly the depth of the channel is preferably not greater than, or at most not much greater than about 5 mm or 4 mm such that the maximum width of a drainage opening formed by two channels in register on facing lateral surfaces of adjacent blocks is approximately 1 cm or less.

The channel may be located at any desired position along the lateral surface, which position may be the same or different for each lateral surface of a block. It is preferred that the channel be positioned for ease of registration with a corresponding channel on an adjacent block. For this purpose the channel may be provided at a central location on one, some or all of the lateral surfaces.

Paving blocks formed in accordance with this aspect of the invention may be made from a permeable or an impermeable material although impermeable material is preferred as this may be stronger and therefore better able to withstand heavier specific loads.

In one embodiment of the invention the paving block also has at least one lateral surface with a tapered portion at or adjacent the region thereof where it joins the top surface of the paving block. Two or more such tapered lateral surfaces may be provided and in the currently most preferred embodiment the block has tapered portions on all lateral surfaces and at least one channel in one or two of the tapered lateral surfaces. The or each channel may extend in such cases from the bottom surface through the tapered section to the top surface. Alternatively the, some or each channel on a block may extend only to the junction of the tapered section and the non-tapered section. The tapered section may have the additional function in use of funnelling water into the drainage channel.

Suitable materials from which the paving block of the present invention may be manufactured will be well known to the skilled man and will be chosen to suit the particular application for which the paving block is to be utilised. Suitable materials include fired clay, concrete and the like. It is preferred that the paving block be made from a suitable sound material which has satisfactory mechanical properties such as compressive strength and flexural strength as well as abrasion resistance, high slip/skid resistance and good frost resistance.

Suitable dimensions and shapes for the paving block will also be well known to the skilled man and will be determined by the particular application for which the paving block is to be utilised. In general, the paving block should have sufficient depth, i.e. the height or length of the lateral surfaces should be sufficient, to ensure dispersion of concentrated loads applied to the paved surface in which the paving block is utilised and in particular should be sufficient to prevent them from tilting under load in situations where they are close-fitted without mortar or sand joint and therefore have relative lateral freedom with respect to adjacent paving blocks.

The paving block may be shaped, configured, patterned or ornamented as desired according to practices well known in the art. Polygonal cross-sectional shapes are preferred particularly those allowing easy tessellation for paved surfaces The top surface of the paving block may be provided with a chamfered edge, for example, at least where it joins the tapered portion of a lateral surface.

The paving block may be used in a wide range of applications including use in a paving system forming part of an industrial estate, a retail or shopping centre, a car park, a lorry park, a driveway, a pedestrian walkway, or for other hard landscaping such as playgrounds etc.

The paving block may particularly be used in paving systems designed for rainwater, flood or spillage management. Such systems, as are described in WO96/12067, are of use in situations where there is a risk of fluid spillage, for example of hazardous chemicals, and there is a desire or need to prevent them from entering existing drainage systems which would allow them to pass uncontrolled into the environment without preliminary treatment or in situations where there is a risk of flooding, for example, by flash storms which overload existing rain or storm water provisions. Such paving systems have a permeable surface on top of a containment system capable of retaining fluid which has drained through the permeable layer. The permeable or porous surface is constructed from a permeable material, e.g. paving blocks which are either porous or are provided with small drainage channels or holes and close-fitted together without mortar or sand joint. Spalling can occur in such systems not only due to the action of weather but by relative movement of the individual paving blocks especially tilting under the action of an applied load.

According to a third aspect of the present invention there is provided a paving system for rainwater, flood or spillage management having a permeable layer on a supporting substrate layer, which supporting substrate layer is permeable to liquid, and is of particulate material providing interstitial cavities for receiving rainwater, floodwater or spillage draining through the permeable layer, wherein the permeable layer is constructed at least partially by the close-fitting without joint filling of a plurality of paving blocks each of which has a top surface, a bottom surface and at least one lateral surface extending between the top and bottom surfaces and abutting in use at least part of a lateral surface of at least one adjacent paving block, wherein a portion of the lateral surface of the block adjacent the top surface is tapered.

The paving system according to the third aspect of the present invention is easy and cheap to lay, allows the permeable paving layer to be easily lifted when required, e.g. for examination, flushing, cleaning or substitution, and is resistant to deterioration caused by spalling of the paving blocks. It has been found that tapering, that is inwardly inclining, an upper portion of the lateral surface of at least some of the paving blocks allows a plurality of such blocks when laid to form a paved surface to move more easily against one another without causing contact damage or spalling of the top surface. Such blocks are hereinafter referred to as tapered paving blocks and may be substantially as hereinbefore described with regard to the first aspect of the invention.

The permeable layer is at least partially but may be fully formed from tapered paving blocks. Where it is formed only partially from tapered paving blocks the remainder of the permeable layer may be formed as a single sheet of porous material or material made porous by the provision of drainage holes or channels or alternatively or additionally the remainder may be formed by discrete paving blocks, preferably laid close-fitting without a joint filling such as mortar or sand some or all of which may be substantially as described above for the second aspect of the invention.

Suitable materials from which the conventional or tapered paving blocks may be manufactured will be well known to the skilled man and will be chosen to suit the particular application for which the paving system is to be utilised. Suitable materials include fired clay, concrete and the like. It is preferred that some or all of the paving blocks be made from a suitably sound material which has satisfactory mechanical properties such as compressive strength and flexural strength as well as abrasion resistance, high slip/skid resistance and good frost resistance. Some or all of the paving blocks may also be made of a porous material such as a porous concrete or alternatively they may be provided with drainage holes or drainage channels located, for example, to extend along the height of a lateral side. The design of the permeable layer will depend in part on whether a porous or infiltration paving system is required.

According to a fourth aspect of the invention there is provided a paving system for rainwater, flood or spillage management having a permeable layer on a supporting substrate layer, which supporting substrate layer is permeable to liquid and is of particulate material providing interstitial cavities for receiving rainwater, floodwater or spillage draining through the permeable layer, wherein the permeable layer is constructed at least partially by the close-fitting without joint filling of a plurality of paving blocks each of which has a top surface, a bottom surface and lateral surfaces extending between the top and bottom surfaces, in which at least one of the lateral surfaces has a channel extending substantially from the top to the bottom surface whereby to provide a drainage path for surface water or other liquid through the channel when the paving block is laid with other such paving blocks to form a paved surface.

Suitable blocks for the fourth aspect of the invention may be substantially as described above for the second aspect of the present invention.

The substrate layer of the paving system is formed from particulate material to provide interstitial cavities in which draining spillage or water can dwell after passage through the permeable layer. The particulate material preferably has a particle size of 15 mm or greater and may have an upper size range of 200 mm to 300 mm. It preferably is of a material which is substantially inert to water, non-friable and frost resistant. Suitable materials include crushed stone, pebbles and blast furnace slag, but other materials are suitable and the choice both of the material and its size and shape (which affect the storage and release capability of the system) will depend upon the particular application of the paving system.

The paving system may additionally be provided with a filtering layer preferably situated between the permeable layer and the substrate layer. The filtering layer should be capable of filtering solids, e.g. debris, waste, etc, from fluids which have passed through the permeable layer. The filtering layer may be a geotextile layer and between 1 mm and 1.5 mm in thickness.

There may also be provided a dispersing layer for dispersing or distributing water or spillage which has passed through the permeable layer over the filtering layer. The dispersing layer may be a bed of gravel, crushed gravel or other small grained particulate material having a particle size preferably between 5 mm to 10 mm in diameter. The dispersing layer not only helps to disperse fluid over the filtering layer, but also provides an initial screening of that fluid to minimise clogging of the layers beneath and in addition can provide a flat surface for the laying of permeable layer.

The paving system is preferably capable of the in situ processing or treatment of water or spillage contained within the system after it has passed through the permeable layer. For this purpose prophylactive or remedial chemicals or bacteria may be introduced or stored within the paving system. The paving system may be such that such chemicals or bacteria introduced or stored are restricted to certain contained sections of the system. In this way water may be treated or hazardous fluids can be rendered harmless before they become dispersed from the system. To assist in the biological decomposition of material passing through the permeable layer 'nests' may be provided within the system where a suitable environment is provided for appropriate bacteria. If necessary required nutrients may be supplied via the permeable layer.

The supporting substrate layer may be contained within a containment membrane of impermeable material. In such cases the containment membrane forms in effect a tank or channel for fluid passing through the permeable layer. Weirs or dividers may be provided to isolate sections of the tank or channel. Such weirs may be permeable, for example, where they are to be used in floodwater control, or impermeable, for example, where they are to be used for chemical or biological processing. They may be an integral part of the containment membrane or separate therefrom.

The paving system may be provided with means for draining off fluid contained within the containment membrane. There may, for example, be provided suitably positioned valves or discharge ducts.

There may also be provided means for enabling gas, such as atmospheric air, to be drawn through at least the substrate layer.

The paving system is advantageously constructed so that all of its elements can be easily lifted out for examination, flushing, cleaning or replacement if required.

The paving system may be used in a wide range of applications including use in a paving system forming part of an industrial estate, a retail or shopping centre, a car park, a lorry park, a refuelling station, a chemical loading bay, a driveway, a pedestrian walkway, a playground or for other hard landscaping where porous rainwater, flood or spillage management may be required.

For a better understanding of the present invention and to show how the same may be put into effect reference will now be made, for the purpose of illustration only, to the accompanying drawings in which:

FIG. 2 is a side view of the paving block of FIG. 1;

FIG. 3 is a plan view of the paving block of FIG. 1;

FIG. 4 is an end view of the paving block of FIG. 1;

FIG. 5 is an enlarged detail of part of the paving block of FIG. 1;

FIG. 7 is a side view of the paving block shown in FIG. 6;

FIG. 8 is a detail in enlarged section taken on the line VII—VII of FIG. 6;

Figure 1:
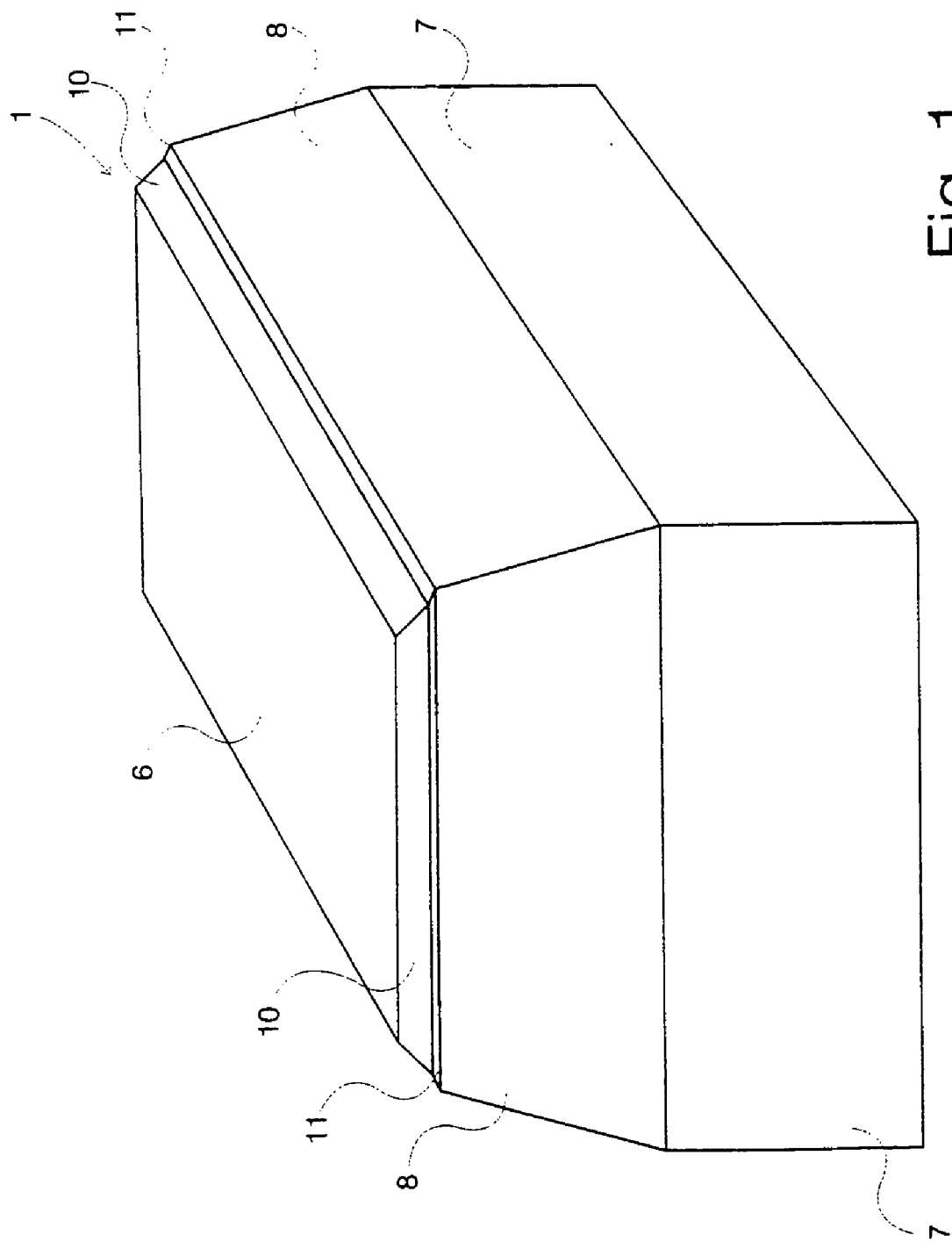
FIG. 1 is a perspective view of a paving block formed as a first embodiment of the present invention.

The paving block illustrated in FIGS. 1 to 5 is a substantially cuboid paving block 1 having a length (dimension 2) of 200 mm, a width (dimension 3) of 100 mm and a height (dimension 4) of 80 mm. The paving block 1 has a substantially rectangular bottom surface 5, a substantially rectangular top surface 6 and two pairs of substantially rectangular opposing lateral surfaces 7.

Each lateral surface 7 is provided with a portion 8 which tapers inwardly towards the top surface 6. The height (dimension 9) of the tapered portion 8 of the lateral surface 7 is 20 mm, i.e. it extends for approximately 25% of the overall height (dimension 4) of the lateral surface 7. The angle at which the tapered surface 8 extends with respect to the lateral surface 7 is approximately 50 to 100 so that it extends inwardly for about 1 mm to 2 mm, e.g. approximately 1.5 mm.

The top surface 6 is provided with a chamfer 10 which extends inwardly from a narrow shoulder 11 extending around the periphery of the top surface 6 at its common edge with the tapered portions 8 of the lateral surfaces 7. The chamfer 10 is inclined at an angle of between 300 to 40°, e.g. approximately 35°, with respect to the top surface 6. The shoulder 11 and chamfer 10 extend inwardly for about 5 mm to 6 mm, e.g. approximately 5.5 mm.

The paving block is of particular use in paving systems where discrete paving blocks are laid close-fitting without mortar or sand joint. In such situations the tapering of the uppermost section of the lateral, i.e. abutting, surfaces of the paving block allows the paving blocks to move more easily against one another without giving rise to spalling on the top surface of the paving block.

Figure 6:
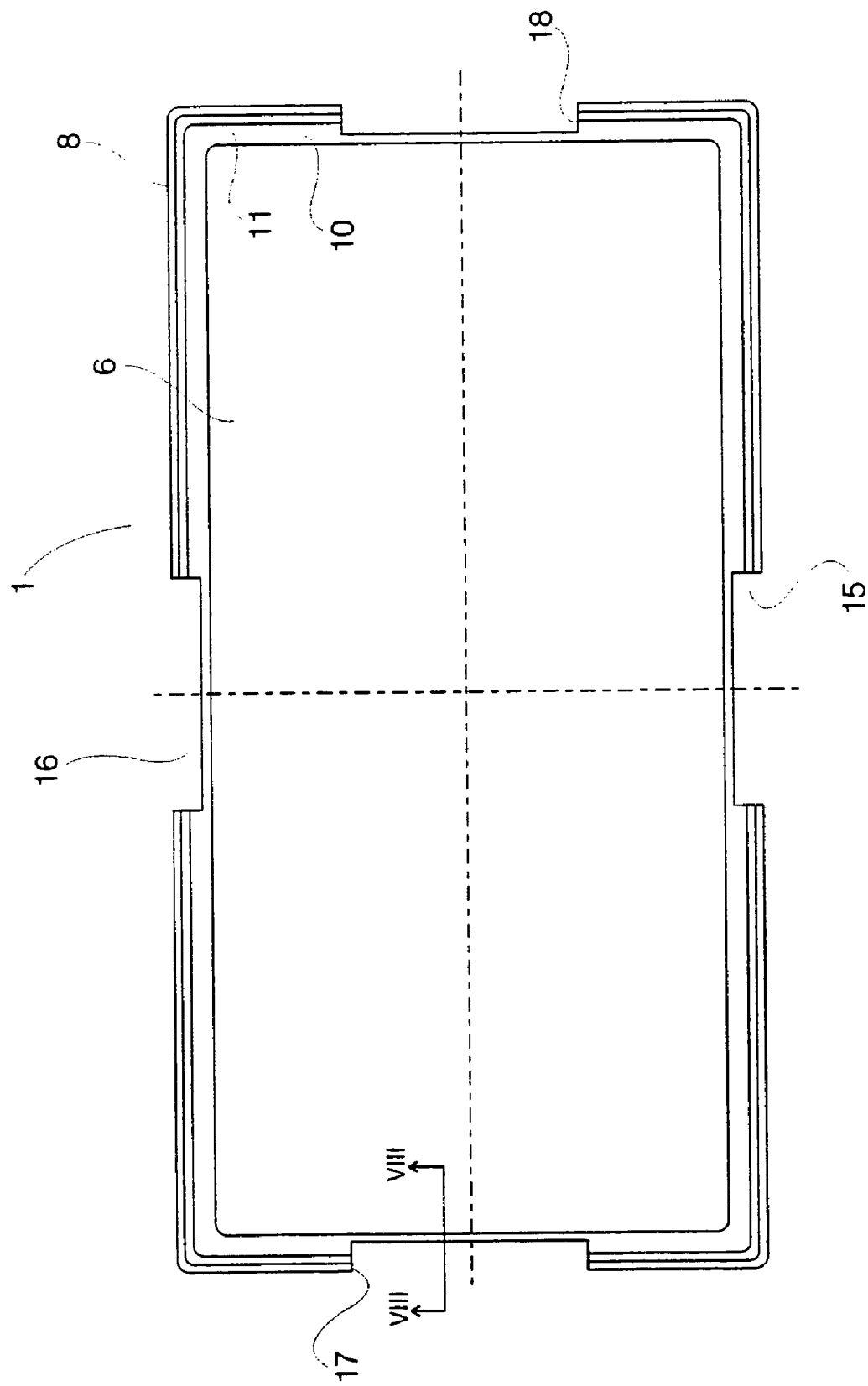
FIG. 6 is a plan view of a paving block formed as a second embodiment of the present invention.

Referring now to FIGS. 6 to 8, the paving block shown is an alternative embodiment of the invention and where possible the same reference numerals have been used to identify the same or corresponding parts thereof.

Like the paving block illustrated in FIGS. 1 to 5, the paving block illustrated in FIGS. 6 to 8 is substantially cuboid and may have the same dimensions as described in relation to the embodiment of FIGS. 1 to 5. This embodiment differs in that the lateral surface 7 at the side of the block has a shallow channel 15 extending from a position close to the top surface 6 across the entire height of the lateral surface 7. As shown in FIGS. 6 to 8, this channel is centrally located in relation to the length 2 of the paving block and a corresponding channel 16 is formed in the opposite lateral surface. Likewise, approximately centrally of the lateral surfaces 7 at the end of the paving block 1 there are formed respective channels 17, 18 having substantially the same dimensions as those of the channels 15, 16.

The depth of the channels 15–18 is approximately 5 mm such that should two such channels of adjacent blocks having facing surfaces be in register the maximum width would be about 10 mm, which is less than the smallest dimension of a heel likely to be encountered. The channels 15–17 nevertheless provide a significant cross-sectional area for drainage of surface water on a paved surface formed by laying the blocks 1 such that it is possible to obtain an adequate drainage rate without making the blocks of permeable material. The use of an impermeable material has advantages in the provision of greater structural strength and resistance to compressive loads so that such impermeable blocks may be used in circumstances, such as lorry parks, where the applied loading may be considerable. As in the embodiment of FIGS. 1 to 5, paving blocks formed in accordance with FIGS. 6 to 8 may be laid close-fitting without mortar or sand joint with the tapered portion uppermost. Such blocks provide a high degree of drainage through the otherwise impermeable surface and, due to the presence of the tapered upper portion of the lateral surfaces, any slight rocking of the blocks as traffic passes over them will be permitted without causing spalling or fracture at the upper surface.

Figure 9:
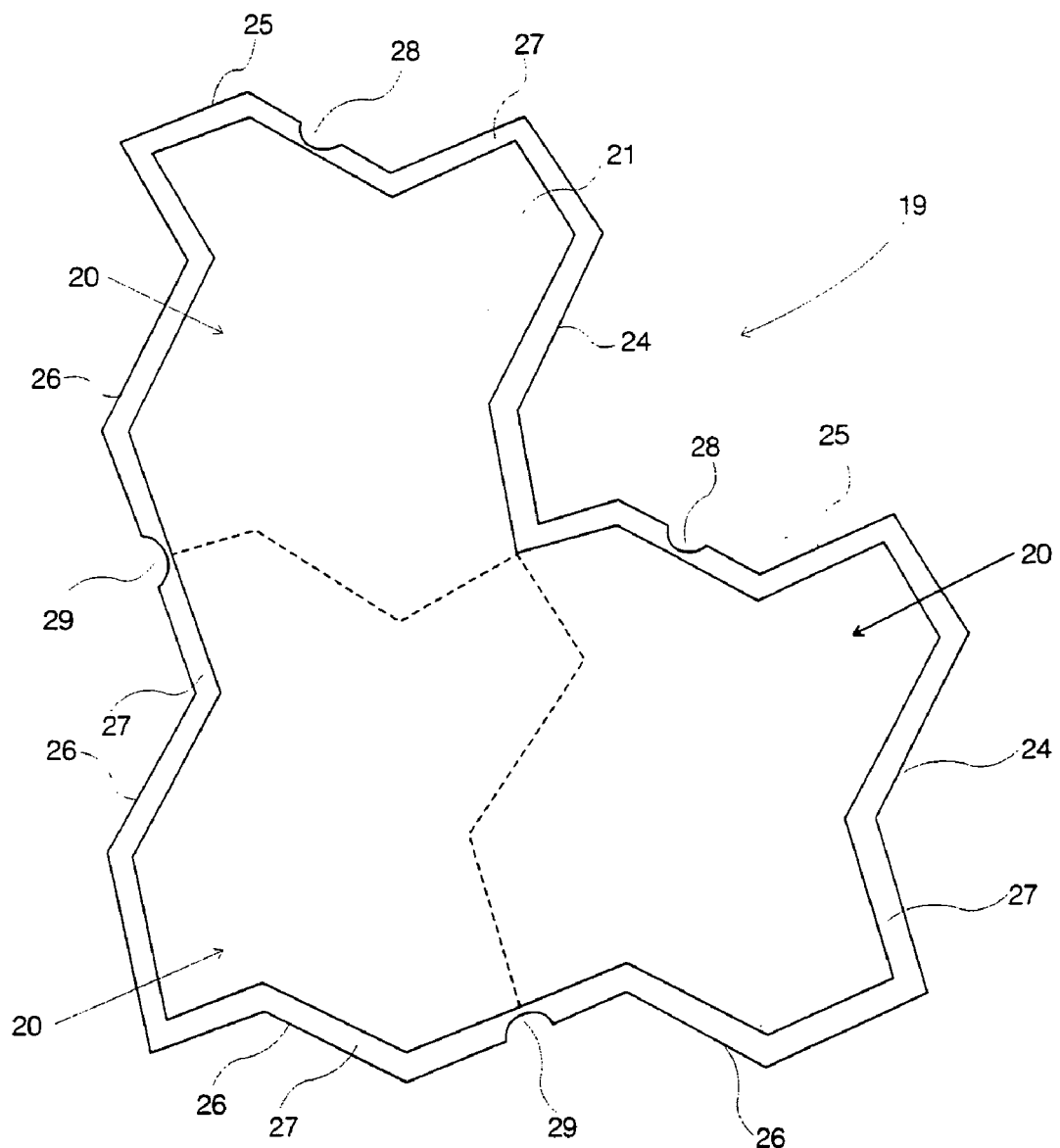
FIG. 9 is a plan view of a third embodiment of a paving block of the present invention.

The paving block 19 illustrated in FIG. 9 has an irregular polygonal cross-sectional shape which shape is formed from three basic irregular polygonal shapes 20 arranged into a L or V shape by placing two of the basic shapes 20 at adjacent sides of the other basic shape 20. The top surface 21 of the block 19 is provided with two indented lines 22, 23 to give the block 19 the appearance of being made up of three individual blocks of the basic shape. The basic shape 20 is based on a square cross-section. Each of the lateral sides 24, 25, 26 of the basic shape 20 is formed from three mutually inclined surfaces placed in a zig-zag configuration and each has a tapered section 27 which inclines towards the top surface 21. The lateral surfaces 25 are provided with a semi-circular cylindrical drainage channel 28 located in the middle one of the mutually inclined surfaces. Additional drainage channels 29 are formed on adjacent mutually inclined end surfaces of the lateral surfaces 26.

Figure 10:
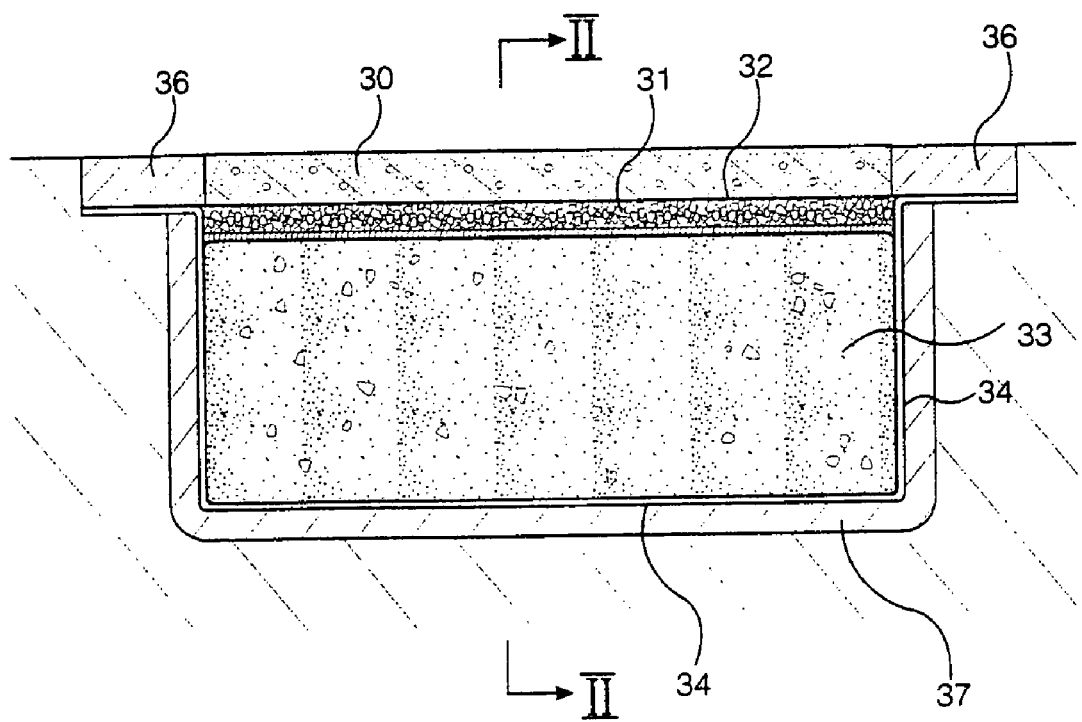
FIG. 10 is a schematic transverse cross-section through a paving system according to the present invention.
Figure 11:
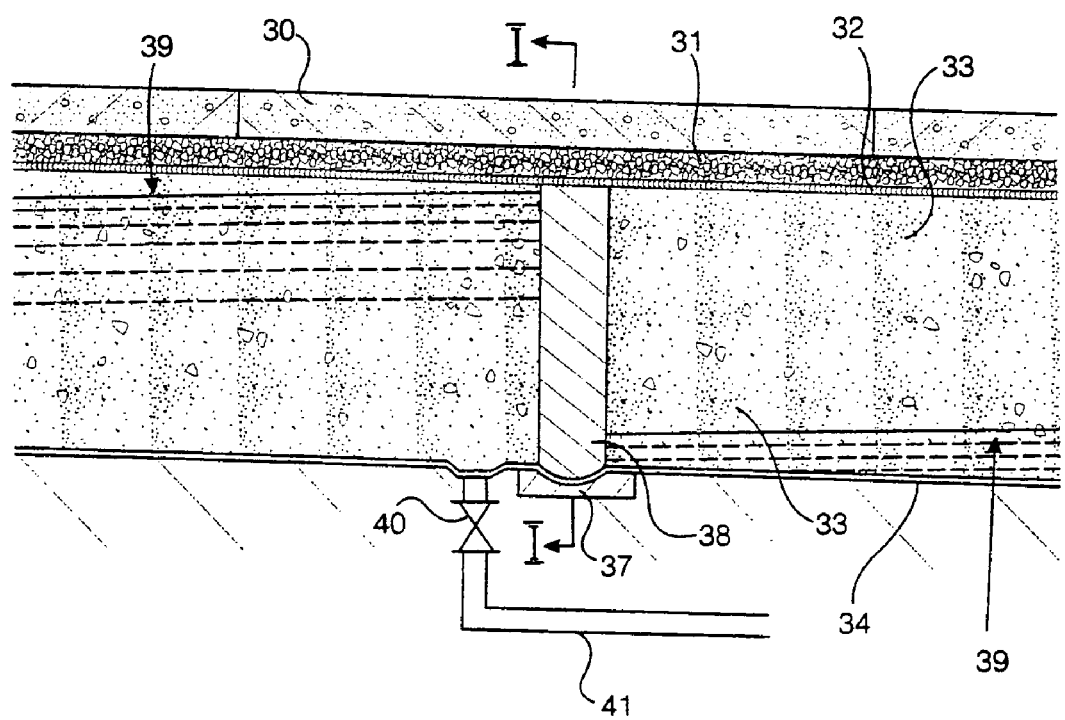
FIG. 11 is a schematical longitudinal cross-section through the paving system of FIG. 10.

The paving system of FIGS. 10 and 11 has a permeable layer 30 (shown schematically) which is formed at least partially from a plurality of tapered paving blocks 1 as shown in FIGS. 1 to 5, a plurality of channel paving blocks as shown in FIGS. 6 to 9 or a combination thereof. The permeable layer 30 is laid upon a dispersing layer 31 formed as a bed of relatively fine gravel. Beneath the dispersing layer 31 lies a filtering layer 32 formed from a geotextile. Beneath the filtering layer 32 lies a supporting substrate layer 33 formed from a relatively coarse particulate material. In this embodiment all of the layers (30 to 33) are contained within a containment membrane 34 of impermeable material which extends beneath all of the layers (30 to 33), up the sides of the dispersing 31, filtering 32 and substrate 33 layers, and then a portion 35 extends outwardly for a short distance away from the permeable layer 30 and is held in place by suitable means such as border blocks or stones 36. In other embodiments (not shown0 the containment membrane may be omitted, particularly if the installation site has a geological structure which permits free drainage.

A U-shaped frame 37 positioned around and below the containment membrane 34 is used to retain a divider or weir 38 as shown in FIG. 11. The bottom edge of the weir 38 is received within the U-shaped frame 37 and traps the containment membrane 34 therebetween. The weir 38 is supported by the substrate layer 33 and extends through at least a portion of the height of the substrate layer 33. A difference in fluid levels on either side of the weir is indicated by the arrows 39. A drain valve 40 and an outlet pipe 41 are provided close to the weir and extend through the containment membrane 34. The valve 40 could be formed as an integral part of the U-shaped frame 37 if desired.

In use fluid, e.g. spillage or rainwater, passes into the system through the porous surface 30. The fluid is evenly distributed over the area of the system by the dispersing layer 31. Solids are filtered out by the filtering layer 32 and are then retained or stored within the interstices of the substrate layer 33 where they may undergo preliminary treatment if required, in particular the biological action of bacteria resident in the interstices in the course particle material of which the layer 33 is composed. Such bacteria may in fact migrate to the filtering layer 32 to act on materials filtered out of the water passing through the filter in use of the system, especially in periods of high utilisation when the interstices of the material 33 may be flooded or flushed with water through a system. When desired fluid may be drained in a controlled manner from the system via valve 40 and outlet pipe 41.

What is claimed is:

1. A paving block having interconnected sides for use in the construction of a paved surface for bearing wheeled traffic, said paving block comprising:
    an upper planar surface and a lower surface spaced from and generally parallel to said upper planar surface,
    a lateral surface extending between said upper surface and said lower surface on each side of the block,
    each lateral surface having a planar lower portion and an associated upper tapered planar portion,
    said planar lower portion lying in a plane generally perpendicular to a plane of said lower surface so that, with the blocks positioned adjacent each other, said lower portions of said lateral surfaces of adjacent blocks abut against each other,
    said upper tapered portion of each lateral surface having a lower edge which intersects and terminates at an upper edge of its associated lower portion of said lateral surface, a plane of said upper tapered portion intersecting the plane of its associated lower portion oriented in a vertical plane at an angle greater than zero degrees and less than fifteen degrees with respect to the vertical plane so that an upper edge of each upper tapered portion is spaced from and generally parallel to the upper edge of the upper tapered portion of an adjacent paving block, and
    at least one of said lateral surfaces having at least one channel extending from said bottom surface towards said upper surface, said channel having a width greater than its depth.

2. A paving block according to claim 1, wherein the upper tapered portion of each lateral surface extends over 10% to 80% of the entire height of the lateral surface.

3. A paving block as claimed in claim 1, in which all lateral surfaces of the paving block have at least one channel therein.

4. A paving block as claimed in claim 1 in which the depth of said at least one channel is not greater than about 5 mm.

5. A paving block as claimed in claim 1 in which the material from which the block is made is impermeable to water.

6. A paving block according to claim 1, wherein the upper surface of the block has a bevelled edge portion around its periphery at its common edge with said tapered portion of sad lateral surface, said bevelled edge portion being inclined with respect to said lateral surface at a greater angle than said tapered portion thereof.

7. A paving block according to claim 6, wherein said bevelled edge portion is inclined at an angle between 30° and 40° with respect to said upper surface.

8. A paving block according to claim 6, wherein a shoulder having a surface generally parallel to said upper surface separates said tapered surface portion from said bevelled edge portion.

9. A paving block having interconnected sides for use in the construction of a paved surface for bearing wheeled traffic, said paving block comprising an upper planar surface and a lower surface spaced from and generally parallel to said upper planar surface, a lateral surface extending between said upper surface and said lower surface on each side of the block, each lateral surface having a planar lower portion and an associated upper tapered planar portion, said planar lower portion lying in a plane generally perpendicular to a plane of said lower surface so that, with the blocks positioned adjacent each other, said lower portions of said lateral surfaces of adjacent blocks abut against each other, said upper tapered portion of each lateral surface having a lower edge which intersects and terminates at an upper edge of its associated lower portion of said lateral surface, a plane of said upper tapered portion intersecting the plane of its associated lower portion oriented in a vertical plane at an angle greater than zero degrees and less than fifteen degrees with respect to the vertical plane so that an upper edge of each upper tapered portion is spaced from and generally parallel to the upper edge of the upper tapered portion of an adjacent paving block.

10. A paving surface according to claim 9, in which the paving blocks are made from a material impermeable to water.

* * * * *

UNITED STATES PATENT AND TRADEMARK OFFICE
CERTIFICATE OF CORRECTION

PATENT NO. : 6,939,077 B1  
DATED : September 6, 2005  
INVENTOR(S) : Peter Leslie Hart It is certified that error appears in the above-identified patent and that said Letters Patent is hereby corrected as shown below:

<u>Title page,</u>
Item [75], Inventor, add -- Litton -- before "Near Bath".
Item [56], References Cited, U.S. PATENT DOCUMENTS, "572762" reference, should read -- 572762    12/1986    Landers    404/31 --.

<u>Column 6,</u>
Line 39, replace "50 to 100" with -- 5° to 10° --.
Line 46, replace "300" with -- 30° --.

Signed and Sealed this

Thirtieth Day of May, 2006

JON W. DUDAS
*Director of the United States Patent and Trademark Office*